Figure 1:
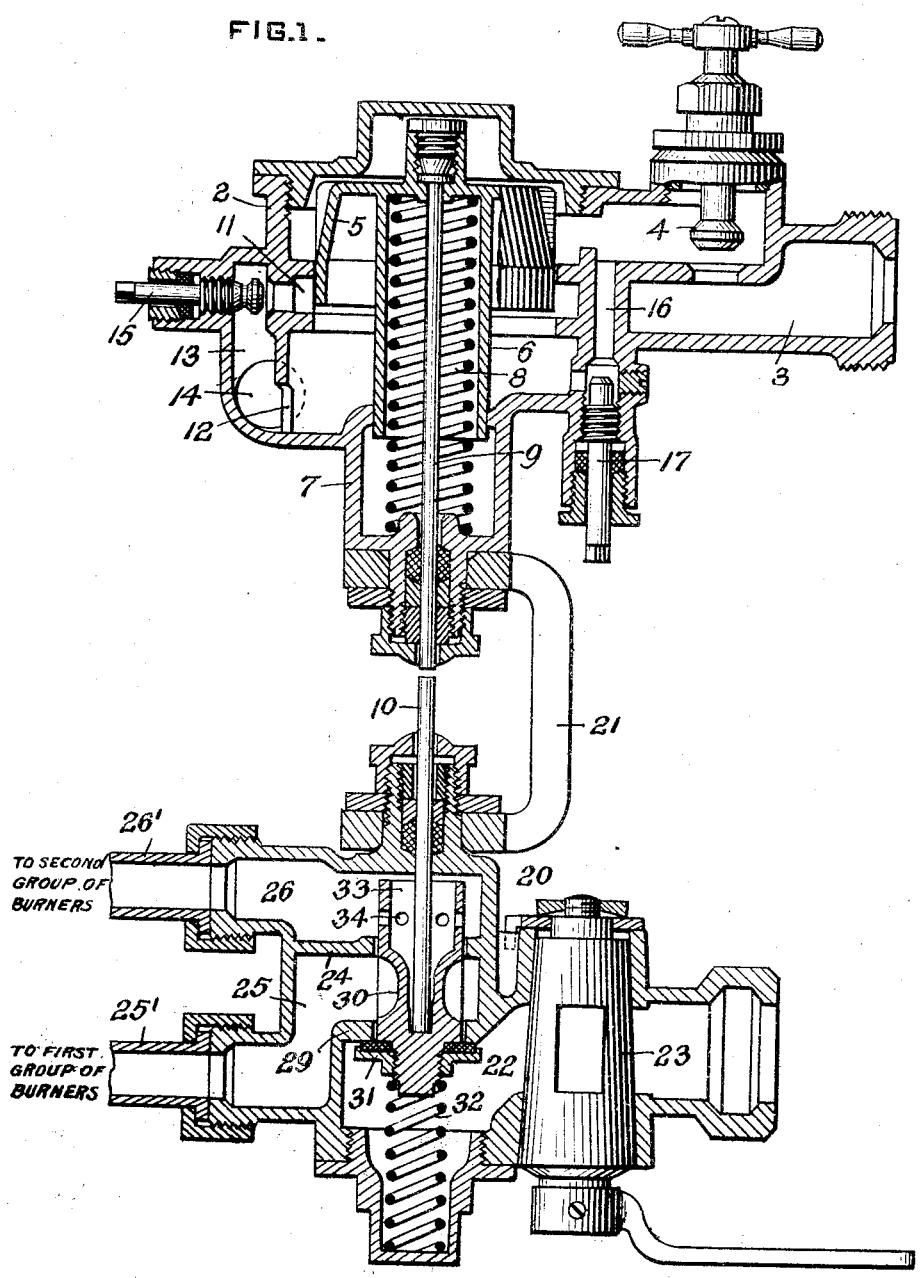

H. S. HUMPHREY.
INSTANTANEOUS WATER HEATER.
APPLICATION FILED FEB. 2, 1916.

1,292,609.

Patented Jan. 28, 1919.
2 SHEETS—SHEET 1.

WITNESSES
J. Herbert Bradley
Ella McConnell

INVENTOR
H. S. Humphrey

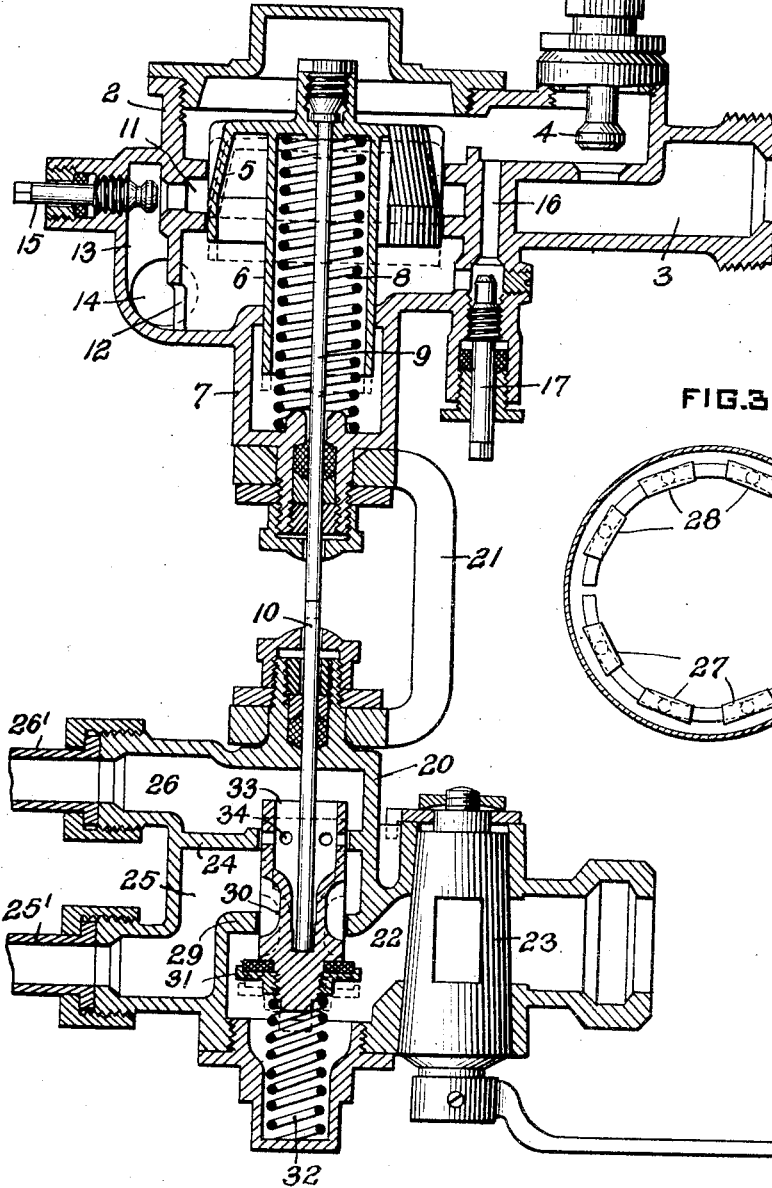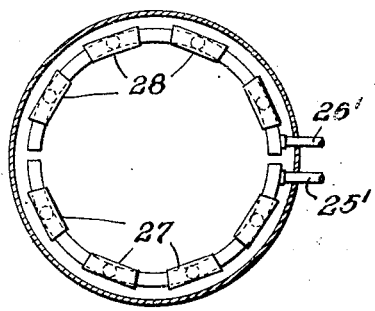

UNITED STATES PATENT OFFICE.

HERBERT S. HUMPHREY, OF KALAMAZOO, MICHIGAN, ASSIGNOR TO RUUD MANUFACTURING COMPANY, OF PITTSBURGH, PENNSYLVANIA, A CORPORATION OF PENNSYLVANIA.

INSTANTANEOUS WATER-HEATER.

1,292,609.  Specification of Letters Patent.  Patented Jan. 28, 1919.

Application filed February 2, 1916. Serial No. 75,681.

*To all whom it may concern:*

Be it known that I, HERBERT S. HUMPHREY, a citizen of the United States, and resident of Kalamazoo, in the county of Kalamazoo and State of Michigan, have invented certain new and useful Improvements in Instantaneous Water-Heaters, of which the following is a specification.

This invention has particular reference to so-called "straight" or "direct" instantaneous water heaters wherein the flow of gas to the burner is controlled wholly by a pressure valve in the water line, the valve operating as a motor to open the gas valve when the pressure at the heater outlet is reduced, as by opening a faucet. Heaters of this type are open to the objection that there is no effective provision for proportioning the gas flow to the amount of water withdrawn, the result being that the full supply of gas is turned on even when a comparatively small amount of water is required, the excessive flow under such circumstances not only being wasteful, but also resulting in heating the limited amount withdrawn to a much higher temperature than is ordinarily desired. In heaters of the character referred to it is impracticable to graduate the supply of gas to the actual supply of water on account of varying water pressures, although of course such graduation is accomplished in other types by interposing a thermostatic control or regulator.

The object of the present invention is to overcome this difficulty in pressure valve heaters by graduating the outlet of the water valve and correspondingly dividing the flow from the gas valve through a plurality of outlets, with each outlet connected to certain of the burners, whereby the number of burners rendered active is determined by the amount of water withdrawn. For example, with a heater that is adapted to deliver four gallons per minute at a given temperature, if the withdrawal is at the rate of two gallons, gas will be supplied to only half the burners. While a two-stage adaptation is here shown wherein the burners are in two groups with each group connected to a separate gas outlet, and wherein a corresponding two-stage water valve is shown, it will be understood that the invention is not limited in this regard as it contemplates broadly utilizing a plurality of stages, determined by the size of the heater and the circumstances attending its use.

In the accompanying drawings, Figure 1 is a sectional elevation of the water pressure and gas valves in normally closed or set position. Fig. 2 is a similar view wherein the full lines illustrate the positions of the valves when approximately one-half of the capacity of the heater is being drawn upon, while in dotted lines the valves are shown in full open position as when operating at full capacity. Fig. 3 is a diagrammatic view illustrating the connections between the gas valve outlets and the burners.

Referring to the drawings, 2 designates the cylinder-forming casing of the water pressure valve, and 3 is the inlet connection thereof, the inflow being controlled by valve 4. 5 is the piston movable in casing 2. The hollow stem 6 of this piston extends through and is guided by the tubular extension 7 of the casing. The piston is held normally raised by spring 8, thereby shutting off the flow through the valve. Secured to the piston and extending through stem 6 thereof is the rod 9 which is adapted to coöperate with similar rod 10 of the gas valve, as will presently be described.

The outlet of the water valve casing is controlled by piston 5, being opened or uncovered by the forward movement of the latter in opposition to spring 8, as when a faucet or other outlet from the heater is opened. In pursuance of the present invention, the outlet is of increasing area in the direction of forward movement of piston 5, in the arrangement shown the outlet being embodied in two ports 11 and 12 in the cylindrical wall of casing 2 which open into chamber 13 to which the valve outlet is connected at 14. Ports 11 and 12 are adapted, respectively, to be placed in communication with the valve inlet 3 by the forward movement of piston 5, the piston first establishing communication with port 11, and upon being moved farther forward uncovering port 12. A valve 15 may be provided for controlling the flow through port 11. Inlet 3 may be connected to the outlet portion of casing 2 through bypass 16, controlled by valve 17, whereby a limited amount of water, such as may result from a leaky faucet, may pass through without disturbing piston 5, and hence without opening the gas valve.

The gas valve casing 20 may be connected to the water valve casing in any suitable manner as by a bracket 21 whereby stems 9 and 10 are held in alinement with each other. The gas valve inlet 22 is adapted to be controlled by plug valve 23 in the usual manner.

A partition 24 within the gas valve casing separates the two delivery chambers 25 and 26 from which lead the pipes 25' and 26', respectively to the separate groups of gas burners 27 and 28, respectively. A partition 29 separates chamber 25 from the gas inlet space 22, and formed through partitions 29 and 24 are alining ports in which is adapted to move the cylindrical valve 30, its head 31 being held normally to its seat on partition 29 by spring 32, as in Fig. 1. The portion of valve 30 which extends into chamber 26 is hollow and of open-end construction as indicated at 33, and is also formed with the lateral ports 34 which are normally open to said chamber.

Operation: If, as in the instance here shown, the valve is of two-stage form, upon withdrawal of water from the heater at the rate of two gallons per minute if the capacity is four gallons, the unbalancing of the pressures at opposite sides of piston 5 will advance the latter to the full line position of Fig. 2, thereby uncovering outlet 11, the effective area of which is controlled by the setting of valve 15. Piston 5 is preferably of hollow construction and with a portion of the head thereof tapered as indicated at 5', whereby port 11 will be uncovered gradually and without opening outlet 12. This forward movement of piston 5 unseats gas valve 30, establishing communication between inlet 22 and chamber 25, but with the gas still closed off from outlet chamber 26. Thus, gas under full head is supplied to say one-half of the burners, the other half remaining inactive. Upon withdrawing water in greater volume from the heater, the further reduction of pressure beneath piston 5 causes it to advance and uncover the water outlet 12 in addition to port 11, and such forward movement also results in moving valve 30 into full open position as in dotted lines in Fig. 2, thereby admitting gas to outlet chamber 26 through the hollow portion of the valve by means of its lateral ports 34, whereby a full head of gas is supplied to both groups of burners when the heater operates at full capacity. Upon closing the outlet from the water valve, both the water and gas valves are restored to normal closed position by their respective springs.

With the gas admitted to the burners in stages as herein proposed, and with one or more stages active as determined by the amount of water withdrawn, excessive use of gas and excessive heating when only a small amount of water is required are prevented, thus in effect providing a graduated control for a straight heater without employing a thermostat or other temperature controlled means.

I claim:

1. In a water heater, the combination of a water valve casing having an inlet and an outlet, a piston within the casing having a variable forward movement and which when moved forward by inlet pressure is adapted to establish communication between said inlet and outlet, a gas valve casing having a plurality of outlets, separate burners for the gas outlets and a gas valve operatively connected to said piston and adapted to open one or more of the gas outlets dependent upon the extent of forward movement of the piston.

2. In a water heater, the combination of a water valve casing having an inlet and an outlet, a piston in the casing having a variable forward movement for controlling communication between said inlet and outlet with the outlet of increasing area in the direction of forward movement thereof, a gas valve casing having a plurality of outlets, separate burners for the gas outlets and a normally closed gas valve controlling said outlets and operatively connected to said piston for opening one or more of said gas outlets depending upon the extent of forward movement of said piston.

3. In a water heater, the combination of a water-valve casing having an inlet and a plurality of outlets, a piston within the casing and when moved forward adapted to establish communication between the inlet and one or more of the outlets determined by the extent of such forward movement, a gas-valve casing having a plurality of outlets, separate burners for the gas outlets, and a normally closed valve operatively connected to the piston and actuated by the latter to open one or more of the gas outlets determined by the extent of forward movement of said piston.

4. In a water heater, the combination of a water valve having a variable forward movement, a gas-valve casing having an inlet and a plurality of outlets, a gas valve controlling communication between the inlet and outlets and operatively connected to the water valve and adapted initially to establish communication with only one of the outlets and upon further opening movement transmitted from the water valve adapted to place another outlet also in communication with the gas inlet, and a separate gas burner for each of the gas outlets.

5. In a water heater, the combination of a water valve, a gas-valve casing having an inlet and a plurality of outlets, the outlets separated from each other and from the inlet by partitions, the partitions spaced apart and having alining ports, a gas valve fitting said ports and normally closed and operatively connected to the water valve, the gas valve having ports normally in communication with the outlet distant from the inlet, the initial opening movement of the valve adapted to establish communication between the inlet and one of the outlets and further opening movement adapted to place the distant outlet also in communication with the inlet through the medium of said valve ports.

6. In a water heater, the combination of a water valve, a gas-valve casing having an inlet and two outlets with the initial outlet separated from the inlet by a partition and the second outlet separated by a partition from the initial outlet, the partitions having alining ports, a valve movable through said ports and normally closing communication between the inlet and the initial outlet, the valve having a tubular open end portion extending into the second outlet and said tubular portion having lateral ports normally open to said second outlet but adapted to be placed in register with the initial outlet by opening movement of the valve, whereby communication is established between the gas inlet and one or both of the outlets determined by the position of the valve, and an operative connection between the gas valve and the water valve.

7. In a water heater, the combination of a water-valve casing having an inlet and an outlet, a piston within the casing and when moved forward by inlet pressure adapted to establish communication between the inlet and outlet, a gas-valve casing having a plurality of outlets, separate groups of burners connected to each outlet, and a normally closed valve operatively connected to the piston and adapted to open one or more of the gas-valve outlets determined by the extent of forward movement of the piston.

8. In a water heater, the combination of a water vavle casing having an inlet and a plurality of outlets, a piston valve movable in the casing and actuated by pressure from the casing inlet for placing the inlet progressively in communication with one or more of said casing outlets determined by the quantity of water per unit of time withdrawn, a spring for opposing movement of the piston, a gas valve actuated by said piston, and means controlled by the valve for delivering a predetermined amount of gas when the initial outlet of the water valve casing is open and for delivering an increased predetermined amount of gas when the piston has been moved sufficiently to open the second outlet of the water valve casing.

9. In combination with a water heater having a plurality of independent gas burners, a gas valve for serially controlling said burners, and an agent actuated by the difference in water pressure between the water inlet and outlet for operating said gas valve.

10. In combination with a water heater having a plurality of independent gas burners, a piston valve for serially controlling the supply of gas delivered to said burners, and a water valve actuated by the difference in water pressure between the water inlet and outlet for operating said piston valve.

11. In a water heater, the combination of a water valve casing having an inlet and a plurality of outlets with each outlet adapted to deliver a predetermined quantity of water per unit of time, a piston valve movable in the casing and actuated by inlet pressure to place the inlet progressively in communication with the outlets, a spring for opposing movement of the piston valve, and a gas valve actuated by the piston valve and constructed to deliver a predetermined amount of gas for each open position of the piston valve.

12. In a water heater, the combination of a water valve casing having an inlet and a plurality of outlets with each outlet adapted to deliver a predetermined quantity of water per unit of time, a piston valve movable in the casing and actuated by inlet pressure to place the inlet progressively in communication with the outlets, the piston valve tapered for increasing the area of communication as the valve moves from closed position, a spring for opposing movement of the valve from closed position, the valve casing constructed with a valved bypass between its inlet and outlet independently of the piston valve, and a gas valve actuated by the piston valve and constructed to deliver a predetermined amount of gas for each open position of the piston valve.

13. In combination with a water heater having a plurality of independent gas burners, a gas valve for serially controlling said burners, a water valve casing having an inlet and a multi-ported outlet, a valve controlling said outlet and operative connections between said valve and said gas valve.

14. In combination with a water heater having a plurality of independent gas burners, a gas valve casing having a single inlet and an outlet port for each burner, a gas valve controlling said outlet ports, a water valve casing having a water inlet and a multi-ported outlet, a water valve controlling said outlet, and means whereby the position of said gas valve is made dependent upon the position of said water valve.

In testimony whereof I affix my signature in presence of two witnesses.

HERBERT S. HUMPHREY.

Witnesses:
 F. A. LEMKE,
 B. M. SCHERER.

CERTIFICATE OF CORRECTION.

Patent No. 1,292,609.  Granted January 28, 1919, to

HERBERT S. HUMPHREY.

It is hereby certified that the State of Incorporation of the assignee in the above numbered patent was erroneously given as "Pennsylvania", whereas said State should have been given as New Jersey, as shown by the records of assignments in the office; and that the said Letters Patent should be read with this correction therein that the same may conform to the record of the case in the Patent Office.

Signed and sealed this 27th day of January, A. D. 1931.

(Seal)

M. J. Moore,
Acting Commissioner of Patents.